June 9, 1942.  G. HEMPEL  2,285,969
TELEMETRIC SYSTEM
Filed May 7, 1941
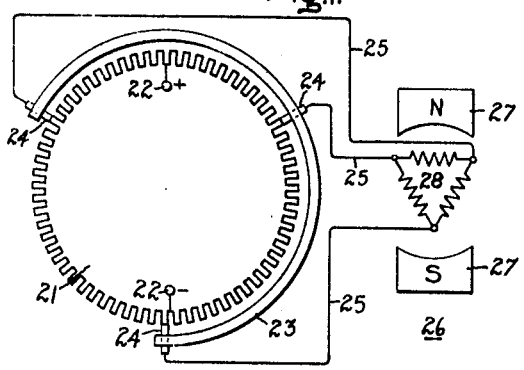
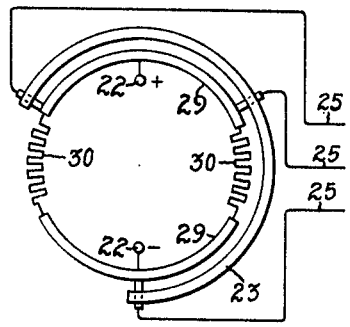
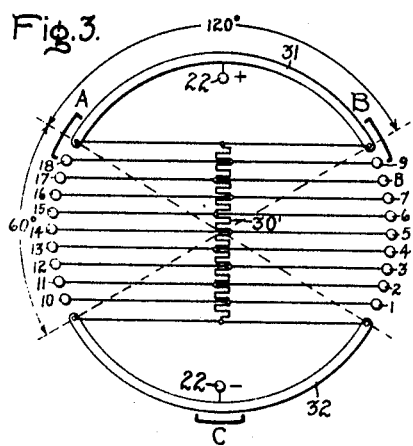
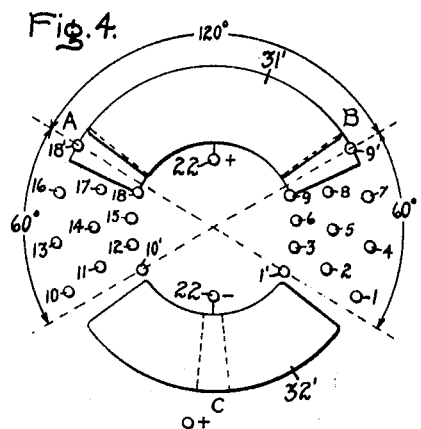
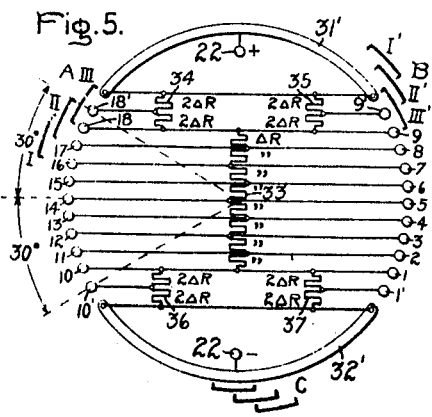
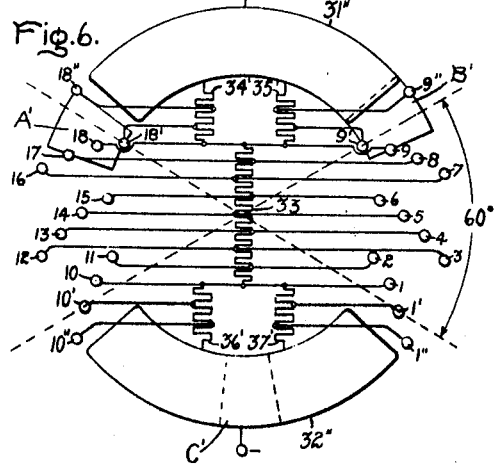
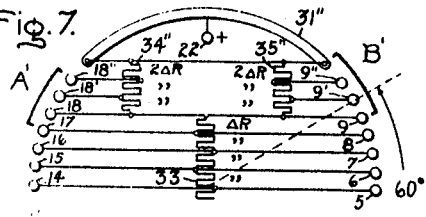
Inventor:
Gerd Hempel,
by Harry E. Dunham
His Attorney.

UNITED STATES PATENT OFFICE 2,285,969

TELEMETRIC SYSTEM

Gerd Hempel, Berlin-Reinickendorf, Germany, assignor to General Electric Company, a corporation of New York Application May 7, 1941, Serial No. 392,367
In Germany February 6, 1940

5 Claims. (Cl. 177—337)

My invention relates to telemeters or systems for transmitting indications or measurements to a distance or for reproducing angular positions.

It is an object of my invention to provide an improved transmitter for a telemetric system.

The objects of my invention include providing an increased number of angular positions, and thus increasing the accuracy and precision of operation for a given diameter of a transmitter, or reducing the diameter appreciably without impairing the reliability of operation.

Other and further objects and advantages will become apparent as the description proceeds.

A better understanding of my invention will be afforded by the following detailed description when considered in connection with the accompanying drawing, and those features of the invention which are believed to be novel and patentable will be pointed out in the claims appended hereto.

In the drawing Fig. 1 is a schematic electric-circuit diagram of a direct-current telemetric system of the type in which my invention may be employed; Fig. 2 is a schematic diagram of a modified form of transmitter which has been used in telemetric systems of the type represented by Fig. 1; Fig. 3 is a schematic diagram serving both to represent a modification in the transmitter of Fig. 2 and to illustrate the advantage of my construction; Fig. 4 is a diagram showing the segment and contact arrangement of a transmitter constructed in accordance with one embodiment of my invention; Fig. 5 is a schematic diagram showing the electrical circuits of the transmitter represented in Fig. 4 and serving to explain the principle of operation thereof; Fig. 6 is a diagram of a slight modification of the arrangement of Fig. 4, and Fig. 7 is a fragmentary schematic circuit diagram of the modification represented by Fig. 6. Like reference characters are utilized throughout the drawing to designate like parts.

Direct-current telemetric or remote indicating systems are known which contain a variable series resistance in a transmission circuit, and other systems are known in which the transmitter operates on the potentiometer principle. In connection with some of these systems the receiver is provided with two or more windings, and there are at least three conductors between the transmitting and receiving points, so that the systems may be referred to for convenience as "polyphase" systems. Because there are a plurality of coils in the receiver connected as in the polyphase windings of polyphase alternating-current units, the direction of the magnetic flux in the receiver is caused to rotate as in polyphase alternating-current machinery when the relative magnitudes of coil currents vary. One form of direct current telemetric systems known to the prior art is represented in Fig. 1 of the drawing. In this case there is a circular potentiometer 21 with a source of direct current 22 connected to a pair of diametrically opposite points of the circular potentiometer 21. There is also a rotatable brush holder 23 carrying three brushes 24 adapted to slide along equally spaced contacts connected to taps in the circular resistor 21, as the brush holder 23 is rotated to correspond to changes in angular positions or indications to be transmitted. The three brushes 24 are each connected to one of the three conductors 25 leading to a receiver 26.

The receiver is shown as having a stationary field magnet represented by a pair of north and south poles 27, and a rotatable armature 28 consisting of three coils connected in delta. It will be understood that rotation of the brush holder 23 produces a variation in the relative magnitudes of the voltages between different pairs of the three conductors 25, so that the relative magnitudes of the current in the coils of the receiver armature 28 are varied to change the direction of the resultant magnetic flux produced by the armature 28. Consequently, the armature 28 rotates in response to rotation of the brush holder 23 at the transmitting point. The receiver may also be of the type shown in Patent No. 2,181,803, Faus, in which there is a delta connected stator with a rotor in the form of a transversely magnetized cylindrical permanent magnet.

The form of transmitter shown in Fig. 1 may be modified to the form shown in Fig. 2, in which there is a pair of stationary contact segments 29 to which the current source 22 is connected and the remainder of the circle of the contact segments 29 is completed by contacts connected to taps along a pair of resistors 30. The two resistors 30 may be replaced by a single resistor 30' connected between contact segments 31 and 32 as in Fig. 3. In the case of "three-phase systems" in which there are three conductors 25, the contact segments 29 of Fig. 2 are each 120 degrees in length and the open spaces represented by the resistors 30 are each 60 degrees in length. The length of the contact segments is 360° divided by the number of "phases" or coils in the receiver and the number of brushes equals the number of "phases." In this case the rotatable brushes 24 slide alternately over the resistor contacts 30 and the contact segments 29 as the brush holder 23 is rotated. As in the arrangement of Fig. 1, within a given angular range of rotation, the voltage between two of the conductors remains constant and the other two line voltages change in relative value, as the brush holder 23 is rotated. For a three-phase system these angular ranges are 60 degrees and at the end of each 60 degree range of rotation one of the brushes slides off one of the contact segments 29 while another brush comes on to that contact segment. Consequently there are always two conductors electrically connected to the contact segments 29 between which the voltage is fixed. The angular precision with which the receiver rotor may be caused to take up a given position depends upon the fineness with which the voltage variations may be graduated by the transmitter. This in turn depends upon the number of contacts and taps connected to the transmitter resistors. The number of contacts which may be provided for a given diameter transmitter is limited, however, by the space available for the required contact surface or by the minimum permissible contact spacing (creepage path).

It has been proposed to distribute the contacts of the potentiometer, not in the spaces left between the contact segments, but in a separate complete circle over which a contact brush is caused to slide at a speed many times that of the control arm transmitter. This leaves more room for contacts so that their number can be increased. This arrangement has the drawback, however, of requiring a reduction gear and special reversing switches for the sliding contacts.

In carrying out my invention, which may be employed either in the series type of transmitter or in the potentiometer type of transmitter represented by Figs. 1 or 2, I do not arrange the contacts in a singe circle or along the segments of a single circle, but I stagger them in a plurality of concentric circles. In this way the angle between successive contacts may be reduced without reducing the contact surface or the actual spacing between the contacts. The number of concentric circles in which the contacts are arranged may be three, as illustrated in Fig. 4, in which contact 1 lies on the outer circle and contact 2, which is connected to the next tap of the potentiometer resistor, lies on the middle circle and is angularly displaced from the contact 1 by a given angle A which is the angular difference representing the finest graduations of position which may be produced by the transmitter. The contact 3, which is connected to the next potenometer tap, is displaced by the same angle relative to contact 2 and lies on the inner circle. The next contact 4 lies on the outer circle displaced the same angle from contact 3 and the remaining contacts are continuously staggered and distributed among the three circles. There are for a three-phase system three brushes A, B and C so designed that they slide simultaneously over all three of the contact circles. In this way rotation of the transmitter arm to which the brush holder is connected causes the brushes to make contact successively with contacts in the outer circle, middle circle, inner circle, outer circle again, and so on. By way of example the transmitter is shown with sufficient contacts to divide each 60° of rotation into ten separate positions corresponding to the 6-degree spacing between the contacts 1 to 9 and 10 to 18. However, my invention is not limited to this specific number of contacts nor is it limited to a "three-phase" system.

Since there is a practicable limit on the minimum width of the brushes, one or more of the adjacent contacts and resistance steps will unavoidably be short circuited when the angular spacing between the contacts is reduced by distributing the contacts in more than one contact circle. This has the effect of diminishing the precision of angular reproduction by causing the receiver to fail to respond to slight rotation of the brushes or to lag behind the rotation of the brushes by reason of the fact that in short circuiting a plurality of contacts the voltages between brushes do not always change until the brushes have been rotated several times the angular distance between contacts.

In Fig. 3 the diameter of the transmitter has been increased and all of the contacts have been placed on the same circle in order to bring out more clearly the effect of having more than one resistor section short circuited by the brushes. The brushes A, B and C in Fig. 3 are shown as short circuiting three contacts or two resistor sections corresponding to the angular width of the brushes in Fig. 4. It will be observed that in Fig. 3 with the brushes in the angular position shown, the voltage between the brushes A and B will be zero and the voltages between the brushes B and C and between the brushes A and C will be a maximum. However, if the brushes are shifted to the left or to the right by an amount corresponding to the angular distance between the contacts, that is, an amount corresponding to one resistor section, the brushes A and B will still make contact with the upper contact segment 31. The voltage between the brushes A and B is still zero and no effect on the receiver is produced although the transmitter arm has been rotated. In a similar manner a lag in the action of the receiver is produced when the brushes have left one of the contact segments 31 or 32 and are contacting only the contacts 1 to 18. In order to eliminate the lack of precision introduced by the fact that the brushes bridge more than one resistor section, I provide parallel-connected additional resistors and additional contacts at the ends of the rows of contacts. The parallel-connected resistors are interposed between the ends of a main potentiometer resistor and the contact segments. For each resistor section, in excess of one bridged by each of the brushes, I provide an additional contact at the ends of the rows of contacts and likewise an additional tap in the additional resistor sections. As illustrated in Fig. 4, there is an additional contact 1' at one end and an additional contact 9' at the other end of the right-hand row of contacts and, similarly, there are additional contacts 10' and 18' at the left. To avoid confusion in the drawing, the electrical arrangement of Fig. 4 is reproduced in the circuit diagram of Fig. 5 with all of the contacts in the same circle. The contacts 1', 9', 10' and 18' are placed at the ends of the 60 degree arcs and the contact segments 31' and 32' are cut back in order to make room for the additional contacts 1', 9', 10' and 18'. The angular spacing between the ends of the contact segments 31' and 32' and the additional contacts 1', 9', 10' and 18' is the same as the angular spacing between the successively numbered contacts which is also the angular spacing between the primed and unprimed contacts 1', 9', 10' and 18'.

The main portion of the transmitter resistance, the potentiometer resistor 33 is divided into a plurality of sections each having a resistance $\Delta R$, taps being brought from the ends of each section to the contacts 1 to 9 and 10 to 18, inclusive. Additional pairs of resistors 34 and 35 and 36 and 37 are interposed in the connections between the ends of the potentiometer resistor 33 and the contact segments 31' and 32'. The additional resistors 34 to 37, inclusive, are also divided into sections according to the number of taps and each section has a resistance twice that of the sections of the potentiometer resistor 33. In the arrangement illustrated in Figs. 4 and 5, since there is one additional contact at each end of the rows of contacts, each of the additional resistors has one tap and each consists of two sections having resistances of $2\Delta R$.

Referring to Fig. 5 it will be understood that actually the contacts 1, 2 and 3 are placed in the outer, middle and inner rows respectively, and that the other contacts are also divided among the three rows in a similar manner. The contacts 1', 9', 10' and 18' are additional contacts arranged as shown in Fig. 4. The sliding brushes and their span are shown schematically in Fig. 5. It will be seen that in one position of the brushes where the brush A takes the position I and the brush B takes the position I', the brush A bridges the contacts 16, 17 and 18, short circuiting two main resistor sections, and the brush B makes contact only with the contact segment 31'. When the brushes are moved clockwise an amount corresponding to the angular distance between adjacent contacts, which corresponds to one section of the main potentiometer resistor 33, the brush A moves to the position II and the brush B to the position II', in which the contacts 17, 18 and 18' are short circuited and the contact 9' is short circuited on the contact segment 31. Accordingly, only one of the sections in the main resistor 33 is short circuited, whereas the lower section of the additional resistance 34 and the upper section of the additional resistor 35 are also short circuited. Consequently, instead of the voltage relationships remaining the same as will be the case in an arrangement like that of Fig. 3, not having additional resistor sections and contacts; the voltage between the brushes A and C increases, whereas the voltage between the brushes B and C remains constant, but the voltage between the brushes A and B decreases from a voltage drop equal to the drop across a resistance $2\Delta R$ to the drop across a resistance $\Delta R$. The resultant resistance of the parallel resistors 34 and 35 is $2\Delta R$ when both sections of the resistor are in the circuit, and is $\Delta R$ when one section of each resistor is short circuited.

If the transmitter is moved another step clockwise the brush A reached position III in which contact segments 18 and 18' are short circuited upon the contact segment 31', and the brush B reaches the position III', in which the contact segments 9 and 9' are short circuited upon the contact segment 31'. Accordingly, the total resistance in the potentiometer circuit is decreased further by the amount $\Delta R$ since both resistors 34 and 35 are short circuited, and the voltage between brushes A and B falls to zero, the voltage between the brushes A and C increasing by another step. The relative magnitudes of the various voltages vary again in a reverse manner as the brushes are rotated clockwise through additional steps. Further rotation of the brushes produces progressive changes in the relative magnitudes of the voltages. Consequently, for each angular position of the transmitter there is a different voltage relationship producing a different resultant direction of the magnetic field of the receiver. Consequently, the receiver follows precisely the movement of the transmitter in sweeping the brushes over successive contacts.

Although I have illustrated and explained my invention in connection with a specific embodiment having three rows of contacts and having brushes each bridging two sections of the main potentiometer resistor at a time, it will be understood that my invention is not limited to this specific arrangement, although it now appears to be most practicable to have three rows of contacts where the brush width is such as to short circuit three contacts at a time or bridge two resistor sections.

For example, if the number of resistor sections bridged by the brushes is two more than a single section instead of only one more than a single section as in the arrangement of Fig. 4, two additional contacts will be provided at each end of each arcuate group of contacts as shown in Fig. 6 where the additional contacts are represented by reference numerals 1', 1'', 9', 9'', 10', 10'' and 18', 18'' and additional resistors 34', 35', 36' and 37' are provided, each having two taps instead of one, the resistance of each section of the additional resistors being $2\Delta R$ as before. The contact segments 31'' and 32'' are provided which are cut down still further from the 120 degree length to provide space for the additional contacts 1'', 9'', 10'' and 18''.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A transmitter for a telemetric system comprising a pair of symmetrically mounted circular contact segments to which a transmitter energizing current source is adapted to be connected, said contact segments lying along the circumference of the same circle, a resistor connected between said segments and subdivided into a plurality of sections by taps, and a plurality of contacts arranged radially staggered in a plurality of circular rows in the circumferential space between said segments, said contacts being connected to said resistor taps.

2. A transmitter for a telemetric system comprising a pair of symmetrically mounted circular contact segments lying along the circumference of the same circle, a current source connected to said segments, a main potentiometer resistor connected between said segments with two pairs of additional resistors connected in parallel interposed in the connections between the ends of said main resistor and said contact segments, a plurality of contacts arranged radially staggered in a plurality of circular rows in the circumferential space between said segments, and a plurality of brushes adapted to make contact progressively with said contact segments and a plurality of adjacent contacts, said resistors being divided into sections by taps, to each of which one of said contacts is connected.

3. A transmitter for a telemetric system comprising a pair of symmetrically mounted circular contact segments lying along the circumference of the same circle and adapted to have a current source connected thereto, a main potentiometer resistor, a pair of additional resistors connected in parallel between one end of said potentiometer resistor and one of said contact segments, a second pair of additional resistors connected in parallel between the other end of said potentiometer resistor and the other of said contact segments, a plurality of contacts arranged radially staggered in a plurality of circular rows in the circumferential space between said segments, a plurality of brushes arranged symmetrically about the center of said contact circle and adapted to make contact with said contact segments and contacts, said brushes being carried by a brush holder relatively rotatable with respect to said contacts and contact segments, said brushes having a radial length exceeding the distance between inner and outer rows of contacts and an angular length equal to two or more times the spacing between any contact and the closest contact thereto in the next row, said resistors being divided into a plurality of sections by taps, said taps each being connected to one of said contacts, the resistance of the sections of the main resistor being equal and the resistance of the sections of the additional resistors equaling twice the resistance of the sections of the main resistor.

4. A transmitter for a "3-phase" direct-current telemetric system comprising a pair of symmetrically mounted circular contact segments lying along a circumference of the same circle and adapted to have a current source connected thereto, a potentiometer resistor, a pair of resistors connected in parallel with one end of said potentiometer and one of said contact segments, a second pair of resistors connected in parallel between the other end of said potentiometer resistor and the other of said contact segments, a plurality of contacts arranged radially staggered in three circular rows in the circumferential space between said segments to form an arcuate group, the angular distance between the end contacts in each group of three rows being 60 degrees, the angular length of said contact segments being enough less than 120 degrees to make the spacings between the ends of the contact segments and the nearest contacts in the rows of contacts substantially equal to the angular spacing between any contact and the nearest contact in another row, and three brushes carried by a brush holder relatively rotatable with respect to said contacts and contact segments, said brushes being of sufficient radial length to make contact with the contacts in any row and of sufficient angular width to contact three contacts at one time, said resistors being divided into sections by taps, each of the additional resistors having one tap connected to the end contact of the arcuate group of contacts, each of the taps in the potentiometer resistor being connected to one of the remaining contacts of the rows of contacts, the resistances of the resistor sections of the potentiometer resistor being equal and being one-half the resistance of the sections of the additional resistors.

5. A transmitter for a telemetric system comprising a pair of circular contact segments lying substantially along the circumference of the same circle and adapted to have a current source connected thereto, a main potentiometer resistor, a pair of additional resistors connected in parallel between one end of said main resistor and one of said contact segments, a second pair of additional resistors connected in parallel between the other end of said potentiometer resistor and the other of said contact segments, a plurality of contacts arranged radially staggered in a plurality of circular rows in the circumferential space between said contact segments to form an arcuate group of contacts, and a plurality of brushes so mounted as to be relatively rotatable with respect to said contacts and contact segments, said brushes being of sufficient radial length to make contact with the contacts in any row of contacts and of such angular width as to bridge two or more times the angular space between angularly adjacent contacts, said resistors being divided into sections by taps, each of the additional resistors having one less tap than the number of spaces between angularly adjacent contacts bridged by each of the brushes, each of the taps in the additional resistors being connected to one of the contacts at the ends of the arcuate group of contacts and each of the taps in the main resistor being connected to one of the remaining contacts of the rows of contacts, whereby the contacts are successively connected to successive taps of the resistors to cause successive resistor sections from one contact segment to the other to be short circuited as any brush is caused to travel around the rows of contacts.

GERD HEMPEL.